United States Patent [19]

Doty, II et al.

[11] Patent Number: 4,797,771

[45] Date of Patent: Jan. 10, 1989

[54] TELEVISION FAULT DETECTION AND PROTECTION APPARATUS

[75] Inventors: James H. Doty, II, Indianapolis; Jeffery B. Lendaro, Noblesville, both of Ind.

[73] Assignee: RCA Licensing Corporation, Princeton, N.J.

[21] Appl. No.: 68,084

[22] Filed: Jun. 30, 1987

[51] Int. Cl.$^4$ .............................................. H02H 3/20
[52] U.S. Cl. ........................................ 361/88; 358/243; 361/91; 328/9
[58] Field of Search ....................... 361/88, 91, 79, 86, 361/85; 358/190, 74, 243; 315/411, 383–385; 328/8, 9

[56] References Cited

U.S. PATENT DOCUMENTS

| | | | |
|---|---|---|---|
| 3,518,482 | 6/1970 | Wilmarth | 328/9 |
| 3,810,024 | 5/1974 | Meacham | 361/88 X |
| 4,024,437 | 5/1977 | Suzuki | 361/88 X |
| 4,045,742 | 8/1977 | Meehan et al. | 328/9 |
| 4,126,816 | 11/1978 | Willis | 358/243 X |
| 4,149,209 | 4/1979 | Stark Jr. | 358/243 X |
| 4,317,133 | 2/1982 | Fernsler et al. | |
| 4,327,376 | 4/1982 | Balaban et al. | |
| 4,343,028 | 8/1982 | Hicks | 361/88 X |
| 4,389,676 | 6/1983 | Balaban | 358/243 |
| 4,402,029 | 8/1983 | Fujita | 361/88 X |
| 4,641,064 | 2/1987 | Testin et al. | 358/243 X |
| 4,737,694 | 4/1982 | Dietz | 358/243 X |

OTHER PUBLICATIONS

A Technical Data Publication for a Bipolar Linear Integrated Circuit (IC) Silicon Monolithic TA7777p that is made by Toshiba Corp. Japan.
U.S. Patent Application Ser. No. 068,085, entitled Deflection Synchronizing Apparatus, in the name of Jeffery Lendaro that was filed concurrently with the above-captioned patent application.

Primary Examiner—M. H. Paschall
Assistant Examiner—Jonathan A. Wysocki
Attorney, Agent, or Firm—Paul J. Rasmussen; Joseph J. Laks; Sammy S. Henig

[57] ABSTRACT

A phase-lock-loop circuit of a deflection apparatus generates a first signal at the horizontal frequency during normal operation. The first signal is coupled to a phase-control-loop circuit that maintains the deflection current timing in phase with the first signal. A fault protection circuit disables the generation of signal transitions in the first signal when a fault condition occurs. A circuit that detects the presence of transition edges in the first signal prevents the operation of the deflection output stage when the transition edges in the first signal are missing.

11 Claims, 2 Drawing Sheets

TELEVISION FAULT DETECTION AND PROTECTION APPARATUS

The invention relates to an arrangement for protecting a television apparatus such as, for example, an x-ray protection circuit.

BACKGROUND OF THE INVENTION

A typical deflection circuit in a television receiver includes an output stage that generates a deflection current in a deflection winding and that generates retrace pulses used for generating an ultor voltage. The output stage is controlled by a horizontal rate switching control signal.

Timing of the deflection current produced by the horizontal deflection circuit output stage may vary in a manner dependent upon loading of the ultor voltage source. For example, such loading may be dependent upon the brightness of the image being displayed on a kinescope of the receiver. Variation in such loading causes, for example, a corresponding variation in a delay of the horizontal retrace pulses and of the deflection current. Furthermore, disadvantageously, it may cause a distortion of the image being displayed.

A circuit embodying the invention includes a dual feedback loop arrangement that is used for preventing the occurrence of the variation in the delay of the deflection current relative to, for example, a horizontal synchronizing signal. In such arrangement, a horizontal oscillator generates a signal at, for example, a frequency greater than the horizontal frequency. The oscillator generated signal is divided down in a frequency divider and a first output signal that is at or near the horizontal frequency is generated. The oscillator, frequency divider and a first phase detector are included in a phase-lock-loop circuit (PLL) that is synchronized by the horizontal synchronizing signal that is obtained, for example, from a sync separator of the television receiver.

The PLL, having a relatively long time constant, controls the oscillator to maintain the first output signal in frequency and phase synchronism with the horizontal synchronizing signal.

In order to compensate for such load dependent variations in the delay associated with the horizontal deflection circuit output stage, a phase-control-loop circuit (PCL) is used. The PCL includes a second phase detector, a first input terminal of which is coupled to the first output signal of the PLL and a second input terminal of which is coupled to the deflection circuit output stage for responding to the retrace pulse generated by the output stage. The phase detector produces a phase difference indicative signal from the signals at the first and second input terminals. A low-pass, loop filter generates a control signal from the phase difference indicative signal. A phase shifting arrangement that is responsive to the control signal produces a horizontal-rate output signal having pulses at the horizontal rate and at a variable delay which makes, for example, the retrace pulses synchronous with the horizontal synchronizing signal even when variations of beam current loading occur.

The PLL may be internal to an integrated circuit (IC) such as, for example, TA 7777 that is made by Toshiba Co. (the Toshiba IC). The Toshiba IC produces, at corresponding output terminals, the first output signal at the horizontal frequency and the aforementioned second output signal at the frequency that is greater than the horizontal frequency and that is synchronized to the first output signal.

In a typical television display system, the high voltage ultor accelerating potential is applied to the final anode electrode of a picture tube to accelerate an electron beam generated at a picture tube cathode onto a phosphor screen. To ensure that the television receiver will not be operated, under a fault condition, at excessive ultor potential level, a high voltage protection circuit is incorporated in the television receiver circuitry. Thus, for example, the Toshiba IC includes such high voltage protection circuit. An excessive ultor potential level, for example, will disable, in the Toshiba IC, the generation of the horizontal rate first output signal, but not of the second output signal at the frequency that is greater than the horizontal frequency.

The PCL that, in a circuit embodying the invention, may be internal to a second IC, is constructed in such a way that it utilizes the second output signal of the PLL of the Toshiba IC that is at the frequency that is greater than the horizontal frequency for its internal operation. Utilization of the second output signal, advantageously, simplifies the design of the PCL. The output signal of the PCL that is synchronized to the first output signal of the PLL controls the switching timing in the deflection circuit output stage.

When the Toshiba IC is used to provide the PLL operation that was described before, the output signal of the PCL may be generated as a result of the presence of the second output signal at the greater frequency even when the first output signal, as a result of the fault condition, is disabled. Disadvantageously, the fault protection circuit of the Toshiba IC, by itself, will not prevent the generation of the output signal of the PCL and, hence, will not prevent the generation of the ultor voltage.

In accordance with an aspect of the invention, recurring signal transitions in the first output signal are detected. When no recurring signal transitions occur, that is indicative of the fault condition, a detection circuitry that detects such signal transitions disables the generation of the output signal of the PCL and thereby prevents the generation of the ultor voltage.

SUMMARY OF THE INVENTION

In accordance with another aspect of the invention, a television apparatus power supply with a fault protection arrangement includes a source of an input signal at a frequency that is related to a deflection frequency. A fault indicative signal is generated when a fault condition occurs in the power supply. A first signal is generated at a first terminal during normal operation having transition edges at a frequency that is related to that of the input signal. When the fault indicative signal is generated, the occurrence of the transition edges of the first signal is prevented. A second signal is generated at a second terminal, both during normal operation and when the fault indicative signal occurs, at a frequency that is related to that of the input signal. A third signal is generated when a transition edge within the first signal is missing. Switching means, switching in response to the second signal and coupled to a load and to a source of input supply voltage develops an output supply voltage for the load during normal operation. The third signal prevents the occurrence of the switching operation that substantially reduces the output supply voltage when the third signal is generated.

BRIEF DESCRIPTION OF THE INVENTION

FIG. 1 illustrates a deflection apparatus that includes a fault protection arrangement, embodying the invention; and FIGS. 2a-2f illustrate timing diagrams that are useful for explaining the fault protection arrangement of FIG. 1.

DESCRIPTION OF THE PREFERRED EMBODIMENT

Figure 1:
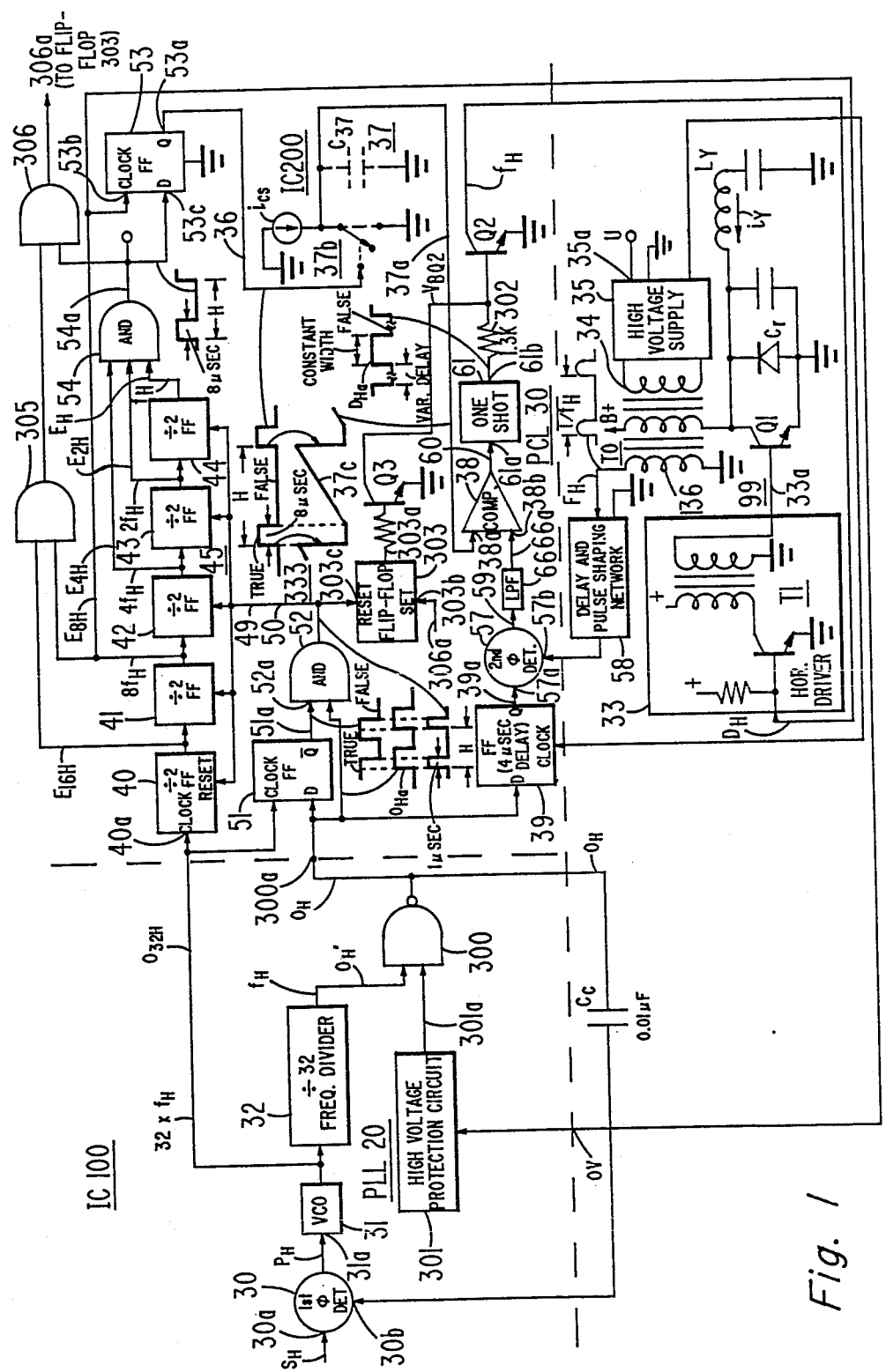

Horizontal sync pulses $S_H$ of FIG. 1 having a period H, that in NTSC is 63.5 microseconds, and having a corresponding frequency $f_H$ are coupled, illustratively, from a conventional sync separator of a television receiver, not shown in the figure, to an input terminal 30a of a phase detector 30. A signal $O'_H$ that, as described later on, at steady state operation, is at the frequency $f_H$, is coupled via a "NAND" gate 300 and a capacitor $C_c$ to a second input terminal 30b of phase detector 30. A phase difference indicative signal PH that is indicative of the phase difference between signal $S_H$ and signal $O'_H$ is coupled to a frequency control input terminal 31a of a voltage controlled oscillator 31. Oscillator 31 generates an output signal $O_{32H}$ at a frequency $32xf_H$. Signal $O_{32H}$ is frequency divided by 32 in a frequency divider 32 to produce signal O+H Thus, detector 30, oscillator 31 and frequency divider 32 form a phase-lock-loop circuit (PLL) 20 that may be included in a first integrated circuit 100 and its externally located associated circuitry such as, for example, capacitor $C_c$. The operation of PLL 20 causes a corresponding transition edge in a corresponding period of each of signals $O_H$ and $O_{32H}$ to be in phase with that of signal $S_H$.

A phase-control-loop (PCL) 30, having a control section that may be internal to a second integrated circuit 200, generates a signal $D_H$ at the frequency $f_H$, as described later on. Signal $D_H$ is coupled to a horizontal driver 33 that generates a drive signal 33a that is coupled to a base electrode of a switching transistor Q1 of, for example, a conventional horizontal output stage 99. Output stage 99 produces, in a winding 34 of a flyback transformer T0, a retrace pulse at a high voltage that is used, in a high voltage supply 35 for generating an ultor voltage U. Voltage U is coupled to an ultor electrode of a cathode ray tube of the television receiver, not shown in the FIGURES.

During normal operation, signal $O_H'$ is coupled via "NAND" gate 300 that is enabled to form a corresponding signal $O_H$ at a terminal 300a. PCL 30 is synchronized to signal $O_H$ in such a way that deflection current $i_Y$ in a deflection winding $L_Y$ is maintained during normal operation in a corresponding constant phase relationship relative to signal $O_H$ despite varying beam current loading that loads winding 34, as described in detail later on.

IC 200 that includes the control section of PCL 30 includes a flip-flop 40 having a clock receiving terminal 40a that receives signal $O_{32H}$ that is at the frequency $32xf_H$. Flip-flop 40 generates an output signal $E_{16H}$ that toggles, or changes states, each time a clocking edge of signal $O_{32H}$ occurs. Signal $E_{16H}$ is at a frequency $16xf_H$ that is one-half of the frequency of signal $O_{32H}$. Flip-flop 40 forms the first stage in a five-stage cascaded-coupled frequency dividing arrangement 45 that includes flip-flops 40-44. Arrangement 45 generates corresponding output signals $E_{16H}$, $E_{8H}$, $E_{4H}$, $E_{2H}$ and $E_H$ at frequencies $16xf_H$, $8xf_H$, $4xf_H$, $2xf_H$ and $f_H$, respectively, at corresponding output terminals of flip-flops 40-44. Signal $O_H$ is coupled via an "AND" gate 52 to a corresponding reset pulse receiving terminal RESET of each of flip-fops 40-44 for insuring a predetermined phase relationship between each of signals $E_{16H}$, $E_{8H}$, $E_{4H}$, $E_{2H}$ and $E_H$ and of signal $O_H$. Each of flip-flops 40-44 assumes a FALSE state when a leading edge $O_{Ha}$ of signal $O_H$ occurs. A flip-flop 51 delays signal $O_H$ by approximately one microsecond to form a delayed signal 51a that is inverted relative to signal $O_H$. The one microsecond delay time is caused by the relative timings between a corresponding clocking edge signal $O_{32H}$ that is coupled to a clock receiving terminal of flip-flop 51 and a corresponding transition edge of signal $O_H$. Delayed signal 51a that is coupled to an input terminal 52a of "AND" gate 52 disables gate 52 one microsecond after leading edge $O_{Ha}$ of signal $O_H$ occurs. Thus, a pulse 50 is generated on a conductor 49 when both signals 51a and $O_H$ are simultaneously at corresponding TRUE states. Pulse 50 that has a duration of approximately one microsecond and that is at the horizontal rate $f_H$ is synchronized to signal $O_H$.

When pulse 50 occurs, each of flip-flops 40-44 is initialized to provide the corresponding output signal at a corresponding predetermined state such as, for example, a FALSE state. Thus, each of the output signals of flip-flops 40-44 is also periodic at the frequency $f_H$ of signal $O_H$ or 50. If no significant phase perturbation in signals $O_H$ and $O_{32H}$ of PLL 20 occurs, after being initialized by signal 50, each of the corresponding output signals of flip-flops 40-44 will remain, in each subsequent period H, in a corresponding constant phase relationship with respect to signal $0_H$.

Signals $E_{16H}$, $E_{8H}$, $E_{4H}$, $E_{2H}$ and $E_H$ that are synchronized to signal $O_H$ are used to provide timing signals that are required for the operation of IC 200 at corresponding predetermined instants that occur during each period H of signal $O_H$. The timing resolution by which each of such timing pulse is formed is determined by the period of signal $O_{32H}$. A signal 36 is an example of such timing pulses. Signal 36 that is used, as described later on, for operating PCL 30 is a horizontal rate signal that is produced at an output terminal 53a of a flip-flop 53.

To generate signal 36, signals $E_{4H}$, $E_{2H}$ and $E_H$ are coupled to corresponding input terminals of an "AND" gate 54, that produces a signal 54a having the TRUE state when each of such input signals is at the TRUE state simultaneously with the other ones. Signal 54a is coupled to a data input receiving terminal 53c of a flip-flop 53. Signal $E_{8H}$ is coupled to a clock input receiving terminal 53b of flip-flop 53. Flip-flop 53 delays signal 54a by an interval having a duration that is determined by signal E8H to form signal 36. Signal 36 is at the TRUE state during approximately 8 microseconds and at the FALSE state during the rest of period H. Thus, signal 36 is delayed relative to signal $O_H$ by a predetermined delay that is determined by signals $E_{8H}$, $E_{4H}$, $E_{2H}$ and $E_H$. Signal 36 is used for controlling the timing of a ramp generator 37 of IC 200 that is used by PCL 30, as described below.

Ramp generator 37 generates a sawtooth signal 37a that is coupled to an input terminal 38a of a voltage comparator 38. Generator 37 includes a current source ics that is coupled to a capacitor $C_{37}$ that is, for example, located externally to IC 200. A switch 37b of generator 37 is coupled across capacitor $C_{37}$ for discharging capacitor $C_{37}$ and for maintaining, afterward, sawtooth signal 37a across capacitor $C_{37}$ at a constant level as long as horizontal rate control signal 36 is at the TRUE state. When signal 36 is at the FALSE state, current source $i_{cs}$ charges capacitor $C_{37}$ to form an upramping portion 37c of signal 37a.

Signal $O_H$ is also coupled via a flip-flop 39 to an input terminal 57a of a second phase detector 57. Flip-flop 39 is clocked by signal $E_{8H}$ to provide a delayed signal 39a that is delayed relative to signal $O_H$ by approximately 4 microseconds. The purpose of the 4 microsecond delay is to compensate for various delays in PLL 30. A signal $F_H$, developed in a winding 136 of flyback transformer T0, is coupled via a delay and pulse shaping network 58 to a second input terminal 57b of phase detector 57. Signal $F_H$ is indicative of the phase of deflection current $i_y$ in deflection winding $L_y$. An output signal 59 of phase detector 57 that is indicative of the phase difference between signal 39a and signal $F_H$ is coupled via a low-pass filter 66 to form a phase control signal 66a at a second input terminal 38b of comparator 38.

When, during a given period H, ramping portion 37b of signal 37a becomes greater than signal 66a at terminal 38b of comparator 38, comparator 38 generates a transition edge of a signal 60 that is coupled to a trigger receiving input terminal 61a of a one-shot flip-flop 61. Consequently, flip-flop 61 generates a pulse $D_{Ha}$ having, illustratively, a constant duration. Pulse $D_{Ha}$ is coupled, during normal operation, via a transistor Q2 to form signal $D_H$. Signal $D_H$ at the collector of transistor Q2 is coupled to horizontal driver 33. Pulse $D_{Ha}$ of signal $D_H$ causes transistor Q1 to be conductive. During normal operation, pulse $D_{Ha}$ occurs, relative to signal $O_H$, after an interval having a variable duration that is controllable in accordance with phase control signal 66a of filter 66. A change in the ultor loading at a terminal 35a of high voltage supply 35 that tends to cause a change in the phase of signal $F_H$, will cause a corresponding change in the delay of signal $D_H$ in a negative feedback manner that will maintain constant the phase of signal $F_H$ and that of deflection current $i_y$ relative to signal $O_H$, despite varying ultor loading.

IC 100 includes a well known high voltage protection circuit 301 responsive to a signal OV that is proportional to ultor voltage U, that prevents signal $O_H$ from changing states when a fault condition occurs. The fault condition occurs, for example, when ultor voltage U exceeds a predetermined permitted level. When such fault condition occurs, circuit 301 generates an inhibit signal 301a. Signal 301a that is coupled to an input terminal of "NAND" gate 300 causes signal $O_H$ to remain at a disabled or TRUE state as long as signal 301a is generated. Therefore, signal transitions in signal $O_H$ are prevented when the fault condition occurs.

On the other hand, signal $O_{32H}$ is generated even when the fault condition occurs. As a result of the operation of frequency dividing arrangement 45, ramp generator 37, comparator 38 and flip-flop 61, pulses $D_{Ha}$ will be generated at an output terminal 61a of one shot flip-flop 61 even when signal $O_H$ is disabled. Pulse $D_{Ha}$ will continue to be generated because, when signal $O_H$ remains at the TRUE state indefinitely, signal 66a of low-pass-filter 66a is less positive than the peak of signal 37a that will enable the generation of pulses $D_{Ha}$.

In accordance with an aspect of the invention, pulses $D_{Ha}$ that are coupled to the base electrode of transistor Q2 through a resistor 302 are prevented from causing the generation of signal $D_H$, when ultor voltage U exceeded the predetermined permitted level. In carrying out such aspect of the invention, a flip-flop 303 is used for detecting the presence of pulses in signal $O_H$. When signal $O_H$ is at the disabled state because of, for example, the disabling operation of protection circuit 301, flip-flop 303, as described below, maintains transistor Q2 at a nonconductive state as long as, for example, generation of signal transitions in signal $O_H$ are prevented. Consequently, the generation of signal $D_H$ and of ultor voltage U are, advantageously, also prevented.

FIGS. 2a–2f illustrate timing diagrams that are useful in explaining the operation of a protection arrangement 333 that includes flip-flop 303 and transistor Q3 of FIG. 1. Arrangement 333 maintains transistor Q2 nonconductive as long as signal transitions in signal $O_H$ are prevented. Similar numbers and symbols in FIGS. 1 and 2a–2f indicate similar items or functions.

Figure 2:
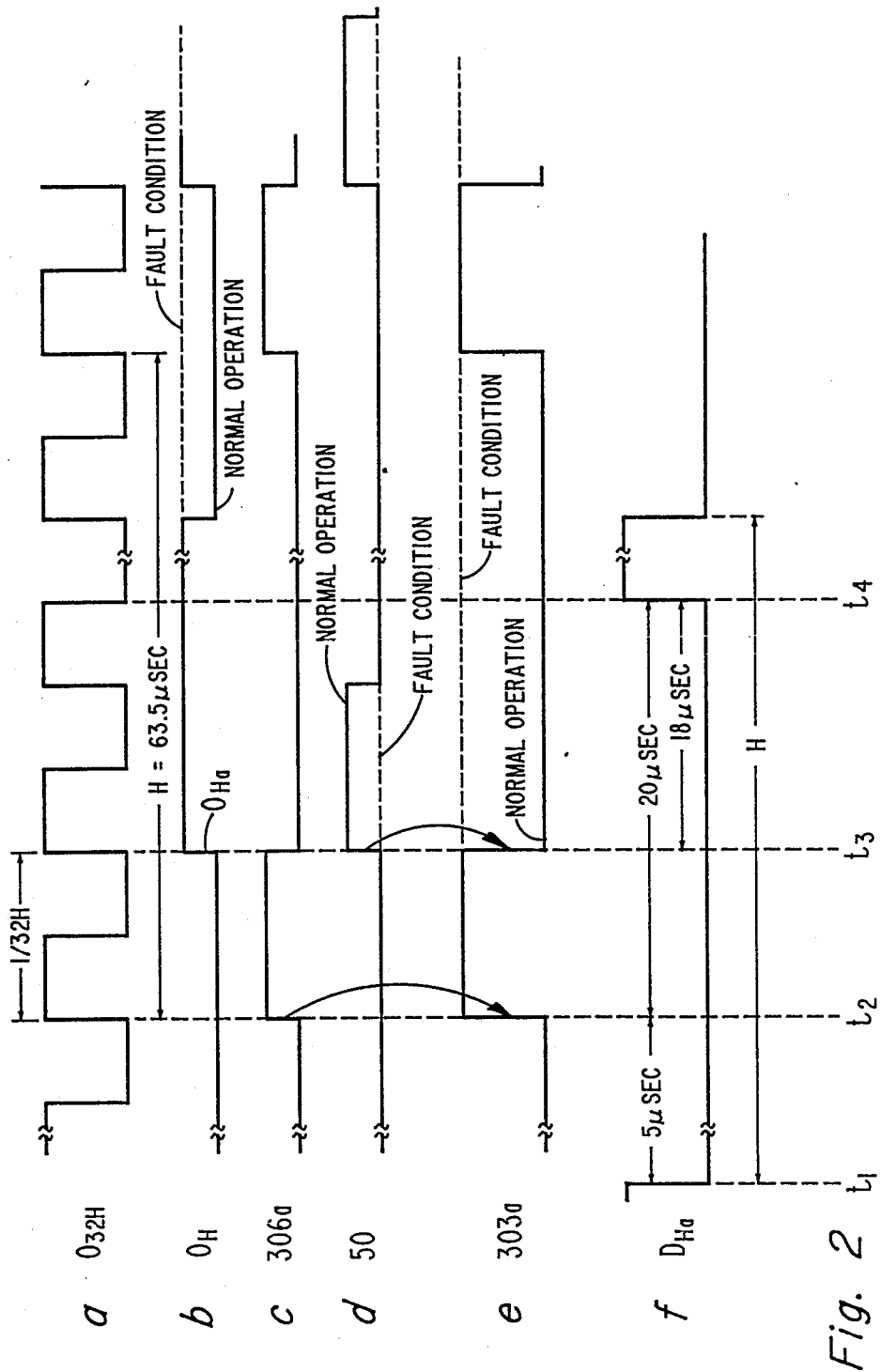

Flip-flop 303 of FIG. 1 that is of the RESET-SET (R-S) type, has a terminal 303b that is coupled to a signal 306a. Signal 306a is generated by an "AND" gate 306, an "AND" gate 305 and "AND" gate 54 when all of signals $E_H$, $E_{2H}$, $E_{4H}$, $E_{8H}$ and $E_{16H}$ are, each, at a corresponding TRUE state. Thus, signal 306a of FIG. 2c is generated during an interval $t_1$–$t_3$ of signal $O_{32H}$ of FIG. 2a that, in normal operation, occurs immediately prior to leading edge $O_{Ha}$ of signal $O_H$ of FIG. 2b. As a result of signal 306a of FIG. 1, flip-flop 303 is set at time $t_2$ of FIG. 2c, causing an output signal 303a to be generated at a TRUE state immediately after time $t_2$ of FIG. 2e.

Signal 50 that, as described before, initializes arrangement 45, is also coupled to a reset terminal 303c of flip-flop 303. During normal operation, signal 50 of FIG. 2d occurs, at time $t_3$, immediately after edge $O_{Ha}$ of FIG. 2b at time $t_3$. Consequently, during normal operation, flip-flop 303 of FIG. 1 is reset and signal 303a of FIG. 2e returns to the FALSE state immediately after time $t_3$.

During normal operation, pulse $D_{Ha}$ has a falling edge at a time $t_1$ of FIG. 2f, that occurs approximately 5 microseconds prior to time $t_2$ of FIG. 2e. Time $t_2$ occurs, as described before, when signal 303a of flip-flop 303 of FIG. 1 changes states. Pulse $D_{Ha}$ has a rising edge at a time $t_4$ of FIG. 2f, that occurs approximately 18 microseconds after time $t_3$ of FIG. 2e. Thus, during normal operation, the duration of pulse $D_{Ha}$ of FIG. 2f overlaps that of signal 303a of FIG. 2e.

At its TRUE state, signal 303a, that is coupled to the base electrode of a transistor Q3 of FIG. 1, causes transistor Q3 to operate as a conductive switch. When conductive, transistor Q3 forms a low impedance between the base electrode of transistor Q2 and ground that maintains transistor Q2 nonconductive.

During normal operation, pulse $D_{Ha}$ of FIG. 2f maintains transistor Q2 of FIG. 1 nonconductive that maintains transistor Q1 oonductive throughout interval $t_1$–$t_4$ of FIG. 2f. Consequently, during normal operation, signal 303a of FIG. 1 has no effect on the conduction of transistors Q2 and Q1.

In carrying out a further aspect of the invention, when, as a result of excessive ultor voltage, for example, signal $O_H$ remains indefinitely at the TRUE state, signal 51a of flip-flop 51 remains at the FALSE state. The FALSE state of signal 51a prevents the generation of signal 50 of FIG. 2d at the TRUE state, as shown by the dashed line. Consequently, signal 303a of FIG. 2e remains, after the fault condition occurs, at the TRUE state for an indefinite duration, as shown by the dashed line in FIG. 2e.

When the fault condition occurs, signal 303a that remains at the TRUE state indefinitely maintains transistor Q2 nonconductive. The result is that, advantageously, transistor Q1 is maintained in cutoff and is prevented from performing its switching operation; therefore, ultor voltage U becomes zero.

Thus, in carrying out another aspect of the invention, signal 303a of flip-flop 303 disables high voltage supply 35 when, as a result of the fault condition, high voltage protection circuit 301 prevents the generation of transition edges in signal $0_H$.

What is claimed::

1. A television apparatus power supply with a fault protection arrangement, comprising:
   a source of an input signal at a frequency that is related to a deflection frequency;
   means for generation of a fault indicative signal when a fault condition occurs in said power supply;
   means responsive to said input signal for generating a first signal at a first terminal during normal operation having transition edges at a frequency that is related to that of said input signal such that when said fault indicative signal is generated, the occurrence of said transition edges of said first signal is prevented, and for generating a second signal at a second terminal, both during normal operation and when said fault indicative signal occurs, at a frequency that is related to that of said input signal;
   missing edge detecting means responsive to said first signal for generating a third signal when a transition edge within said first signal is missing;
   a source of input supply voltage;
   a load;
   switching means, switching in response to said second signal and coupled to said load and to said source of input supply voltage for developing an output supply voltage for said load during normal operation; and
   means responsive to said third signal and coupled to said switching means for generating a signal that prevents the occurrence of said switching operation to substantially reduce said output supply voltage when said third signal is generated.

2. An apparatus according to claim 1 wherein said first signal is at a frequency that is related to a horizontal frequency and wherein said second signal is at a higher frequency than that of said first signal.

3. An apparatus according to claim 1 further comprising a deflection winding that forms with said switching means a deflection circuit output stage.

4. An apparatus according to claim 3 further comprising, means coupled to said switching means for generating an ultor voltage, wherein said fault indicative signal generating means generates said fault indicative signal when said ultor voltage exceeds a predetermined level that prevents subsequent generation of said ultor voltage.

5. An apparatus according to claim 1 wherein said missing edge detecting means generates said third signal that remains indefinitely at a first state when said fault indicative signal occurs to prevent the generation of said first signal, and wherein said third signal is coupled in a signal path that is between said switching means and said second signal for decoupling said second signal from said switching means.

6. An apparatus according to claim 1 wherein, during normal operation, said missing edge detecting means generates said third signal that changes alternately between a first and a second state in a manner that maintains said switching operation in said switching means substantially unaffected and when said fault indicative signal occurs said missing edge detecting means generates said third signal at one of said first and second states.

7. An apparatus according to claim 6 wherein said third signal generating means comprises a flip-flop having a first input terminal that is coupled to said first signal and a second input terminal that is coupled to said second signal such that when the occurrence of said transition edges in said first signal is prevented, said flip-flop assumes said first state indefinitely.

8. An apparatus according to claim 1 wherein said first and second signals generating means comprises a phase-lock-loop circuit that is synchronized to said input signal.

9. An apparatus according to claim 1 further comprising a frequency divider responsive to said second signal for generating a fourth signal, both during normal operation and when said fault signal occurs, at a frequency that is lower than that of said second signal, a ramp generator responsive to said fourth signal for generating a ramp signal having a sawtooth waveform at a phase that is determined by that of said second signal, means for generating a deflection current in a deflection winding and for generating a phase indicative signal that is indicative of said phase of said deflection current, a phase detector responsive to said first signal and to said phase indicative signal for generating a phase difference indicative signal in accordance with a phase difference between said phase indicative signal and said first signal, phase shifting means responsive to said phase difference signal and to said ramp signal for generating an output signal during both normal operation and when said fault indicative signal occurs that is at a frequency that is determined by that of said ramp signal and at a phase that is determined by said phase difference signal and coupling means responsive to said output signal of said phase shifting means and to said third signal for coupling said output signal of said phase shifting means to said switching means, during normal operation, and for decoupling said output signal of said phase shifting means from said switching means when said third signal is generated.

10. An apparatus according to claim 9 wherein said first and second signals generating means comprises a phase-lock-loop circuit and wherein said phase shifting means, said phase detector and said phase indicative signal form a phase-control-loop circuit.

11. An apparatus according to claim 10 wherein said phase-lock-loop circuit is included in an integrated circuit and wherein said first and second terminals where said first and second signals, respectively, are generated are coupled to said phase-control-loop circuit that is located outside said integrated circuit.

* * * * *